United States Patent
Swahn et al.

(10) Patent No.: US 6,526,124 B1
(45) Date of Patent: Feb. 25, 2003

(54) METHOD FOR TESTING AN OBJECT IN A TELECOMMUNICATIONS SYSTEM

(75) Inventors: Tom Swahn, Esbo (FI); Mika Kämäräinen, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/674,919

(22) PCT Filed: Apr. 20, 1999

(86) PCT No.: PCT/FI99/00319

§ 371 (c)(1),
(2), (4) Date: Jan. 12, 2001

(87) PCT Pub. No.: WO99/59317

PCT Pub. Date: Nov. 18, 1999

(30) Foreign Application Priority Data

May 8, 1998 (FI) .................................................. 981029

(51) Int. Cl.[7] .............................. H04M 1/24; H04M 3/22
(52) U.S. Cl. ........................ 379/29.01; 379/1.01; 379/9; 379/26.01; 379/29.01
(58) Field of Search ............................... 379/1.01, 9.01, 379/9, 9.06, 12, 15.01, 22, 22.01, 26.01, 27.01, 29.01, 29.1, 29.11, 30, 22.04, 22.05, 24

(56) References Cited

U.S. PATENT DOCUMENTS

| | | | |
|---|---|---|---|
| 4,392,026 A | * | 7/1983 | Kojima et al. ................. 379/30 |
| 4,447,679 A | * | 5/1984 | Kojima et al. ............ 379/29.01 |
| 4,582,964 A | * | 4/1986 | Pickens .......................... 379/8 |
| 4,670,897 A | * | 6/1987 | Parsons et al. ........... 379/10.01 |
| 4,860,281 A | * | 8/1989 | Finley et al. ............. 379/22.01 |
| 5,835,566 A | * | 11/1998 | Cowgill .................... 379/10.01 |
| 6,038,288 A | * | 3/2000 | Thomas et al. .......... 379/15.01 |

OTHER PUBLICATIONS

International Telecommunication Union, "Functional Description of the Message Transfer Part (MTP) of Signalling System No. 7", Mar. 1993, pp. 1–20.
International Telecommunication Union, "Signalling Data Link", 1993, pp. 1–6.
International Telecommunication Union, "Signalling Network Functions and Messages", Jul. 1996, pp. 1–207.
International Telecommunication Union, "Signalling Link", Jul. 1996, pp. 1–87.
International Telecommunication Union, "Signalling System No. 7—Signalling Network Structure", Mar. 1993, pp. 1–23.
International Telecommunication Union, Signalling System No. 7—Message Transfer Part Signalling Performance, Mar. 1993, pp. 1–36.
International Telecommunication Union, "Testing and Maintenance", 1993, pp. 1–6.

* cited by examiner

*Primary Examiner*—Duc Nguyen
*Assistant Examiner*—Quoc Tran

(57) ABSTRACT

In a telecommunications system, an object having an incoming side and an outgoing side is tested using a plurality of test components allocated in parallel for the incoming and outgoing sides of the object. The in-parallel allocated test components perform testing routines for the incoming and outgoing sides of the object. A main test component is connected to each of the in-parallel allocated test components, and equivalently controls operations of the in-parallel allocated test components. The resulting test structure for testing the incoming and outgoing sides of the object, is symmetric.

8 Claims, 6 Drawing Sheets

METHOD FOR TESTING AN OBJECT IN A TELECOMMUNICATIONS SYSTEM

FIELD OF THE INVENTION

The present invention relates to a method for testing objects in a telecommunications system. The invention relates further to an arrangement for performing testing operations in a telecommunications system.

BACKGROUND OF THE INVENTION

A telecommunications network includes various objects or implementations, such as exchanges or switches, that need to be tested. The purpose of the testing is to test e.g. the used protocol and functionality of the telecommunications network and the various part and components thereof. Two common testing procedures are conformance testing and function testing. From these the first is used to test the conformity with the used standard or protocol, and the latter is used to test that the system or object operates and functions in accordance with the standards and protocols. The "border line" between these is not, however, especially clear and tight, and thus these test may overlap.

A test may be accomplished when taking a new system in use, after maintenance, preparations or upgrading of a system, or periodically, i.e. certain intervals, or occasionally, e.g. after a certain predetermined event has occurred, or even randomly. In a telecommunications system the test may concern only one of the plurality of objects, e.g. one exchange, or then the whole system may be tested entirely or partially, i.e. all or predefined components (objects) of the system are tested during one test cycle.

An Abstract Test Method (ATM) and the testing configuration according to the ITU-T (International Telecommunication Union—Telecommunication Standardization Sector) and ETSI (European Telecommunications Standard Institute) are having a non-symmetric structure. The configuration of the testing arrangement is such that a Main Test Component (MTC) is arranged to serve the outgoing side of an apparatus to be tested and a Parallel Test Component (PTC) is arranged to serve the ingoing side of the apparatus to be tested (or vice versa).

However, a problem of this kind of testing arrangement is that the incoming and outgoing sides of the objects cannot be equivalently controlled in the testing process. In addition, the results obtained from the different sides are not comparable to each other. This in turn causes difficulties when analyzing the obtained test results.

SUMMARY OF THE INVENTION

It is an object of the present invention to overcome the disadvantages of the prior art testing solutions and to provide a new type of solution for implementing a testing process of objects in a telecommunications system.

An object of the present invention is also to provide a method and arrangement by means of which it is possible to obtain comparable testing results from an incoming side and an outgoing side of an object, such as a telephone exchange.

Other objects and advantages of the present invention will be brought out in the following part of the specification taken in conjunction with the accompanying drawings.

The objects are obtained by a method for testing an object in a telecommunications system, said object having an incoming side and an outgoing side, wherein a plurality of test components is allocated in parallel for the incoming and the outgoing sides of the object, testing routines are accomplished by the plurality of in parallel allocated test components for the incoming and the outgoing sides of the object, the operation of the in parallel allocated test components is equivalently controlled by a main test component connected to each of the parallely allocated test components, whereby a symmetric test structure is provided for testing the incoming and the outgoing sides of the object.

A preferred an arrangement for testing an object in a telecommunications system, said object having an incoming and an outgoing side, comprises a plurality of test components which are allocated in parallel for the incoming and the outgoing sides of the object under test, and a main test component arranged to equivalently control each of the in parallel allocated test components in the incoming and the outgoing sides of the object, whereby a symmetric test structure is provided for testing the object.

Several advantages are obtained by means of the present invention. The solution provides a symmetric testing arrangement, in which all testing components can be equally controlled. The testing results obtained from two different sides of an object to be tested ar comparable to each other which makes the further analyzing of the results easier to accomplish, and gives more reliable results for the testing procedures.

In the following the present invention and the other objects and advantages thereof will be described in an exemplifying manner with reference to the annexed drawings, in which similar reference characters throughout the various figures refer to similar features.

DETAILED DESCRIPTION OF THE DRAWINGS

Figure 1:
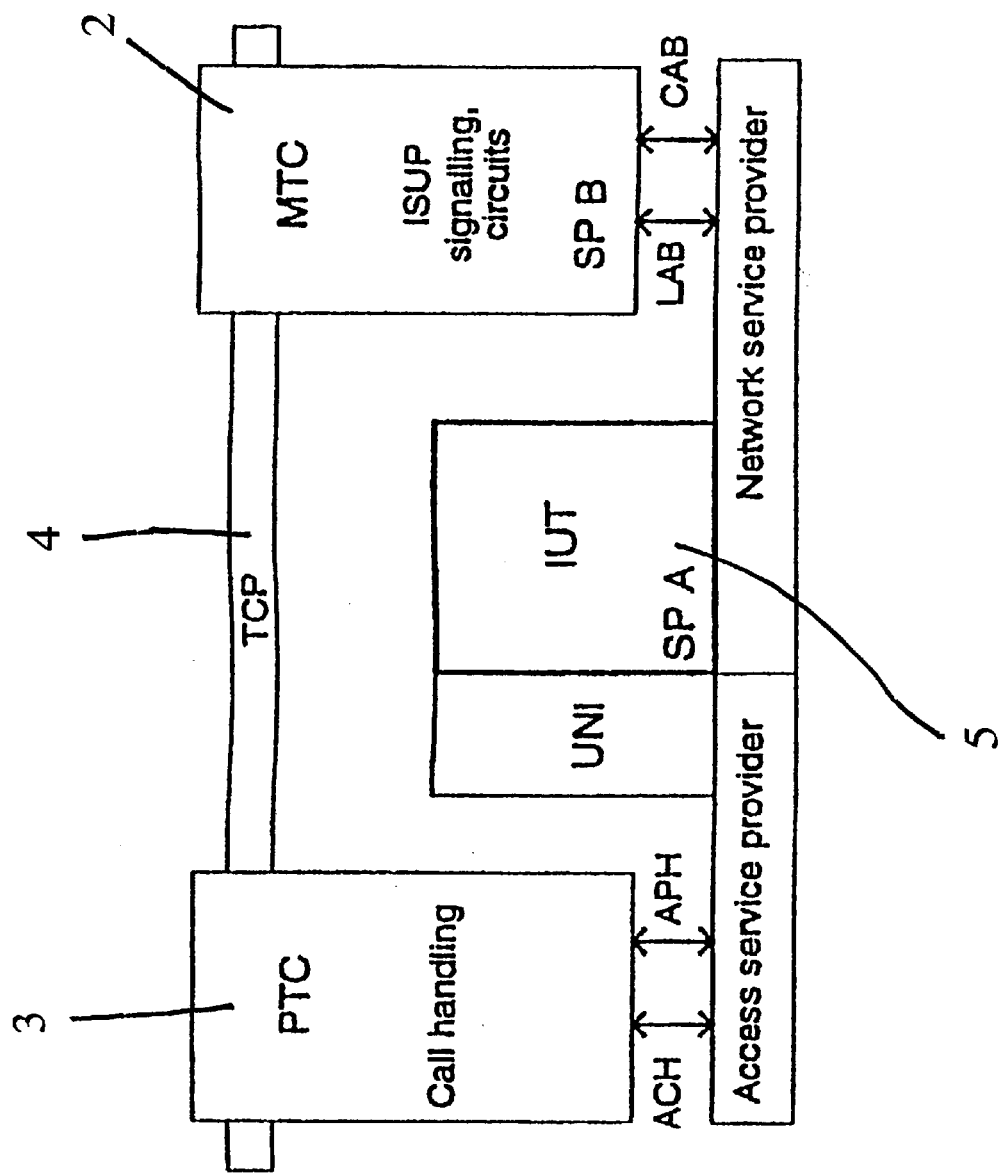
FIG. 1 is a schematic presentation of a prior art testing arrangement.

FIG. 1 is a schematical presentation of a prior art arrangement for testing an object in a telecommunications system. More precisely, the arrangement is an ISUP (ISDN User Part) test configuration for local exchanges. However, it is to be noted that other transit protocols than ISUP can also be tested by this solution.

As illustrated, the prior art arrangement includes a Main Testing Component (MTC) 2 and a Parallel Testing Component (PTC) 3 for testing the object, i.e. an Implementation Under Test (IUT) 5. Test Coordination Procedures (TCP) 4 are implemented between the MTC 2 and the PTC 3 so as to provide a link between the two testers. The PTC 3 forms a slave process for the MTC 2, and is located in a separate test step. Thus, and as can be seen from FIG. 1, the structure is asymmetric (the MTC and the PTC are operating parallel, even though the operation and general structure thereof is different), and thus the prior art configuration has the disadvantages already referred to in the above.

Figure 2A:
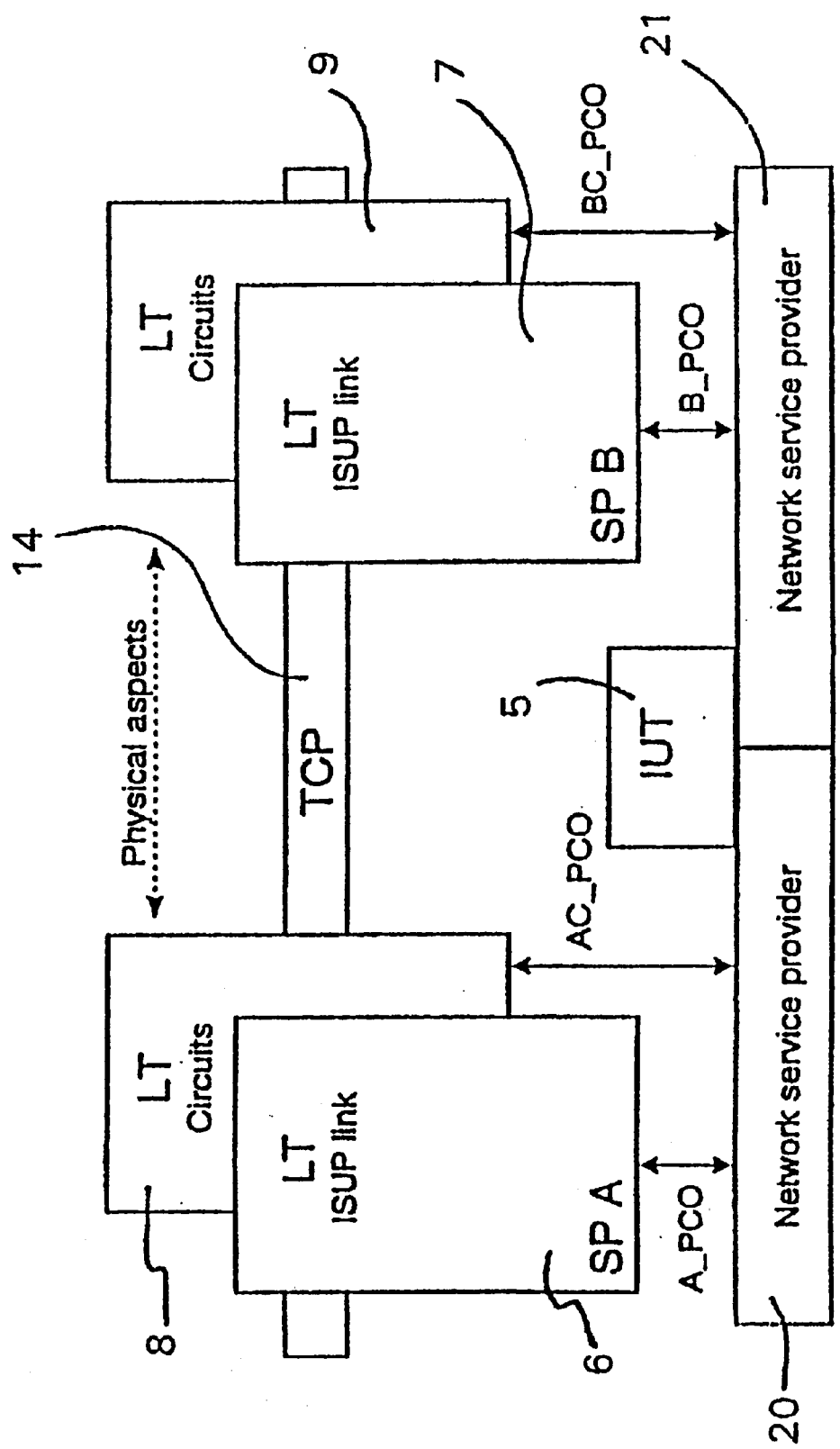
FIGS. 2a and 2b are schematic presentations of one embodiment of the present invention.
Figure 2B:
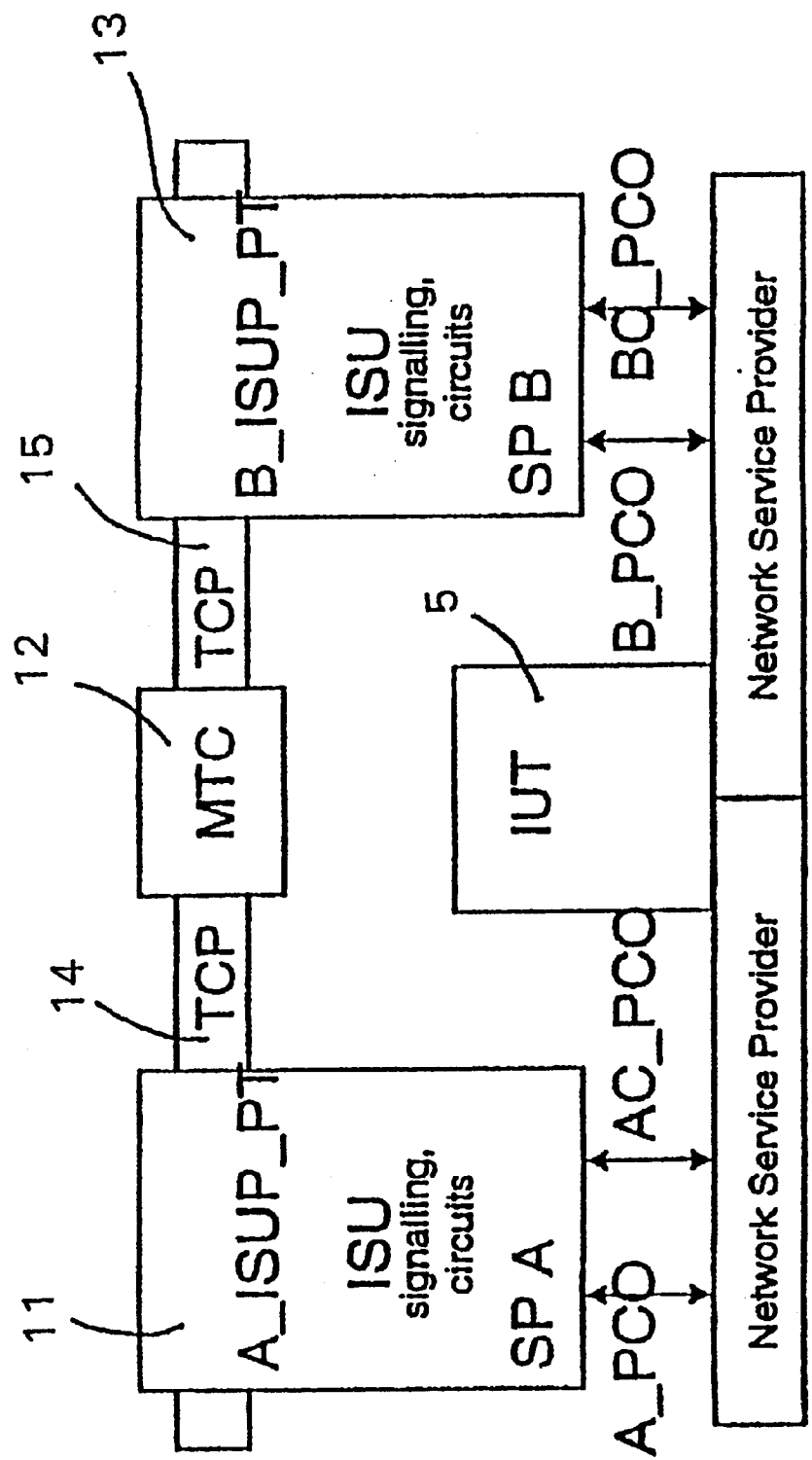

FIGS. 2a and 2b disclose schematically one embodiment, and more precisely, a concept and configuration for testing intermediate exchanges (transit exchanges, gateway exchanges etc.). The unit to be tested may be referred to as SUT (System Under Test) or an IUT (Implementation Under Test). A SUT has an incoming and an outgoing side, which are to be considered during the test in order to test e.g. the protocol and functionality of a transit or a gateway exchange.

An IUT (Implementation Under Test) 5 is provided on the interface between two network service providers 20 and 21. The IUT 5 is observed and controlled from two ISUP (ISDN User Part) links, i.e. LT (Lower Tester) ISUP links 6 and 7, with associated circuits, i.e. LT Circuits 8 and 9, respectively. A Test Coordination Procedures (TCP) link 14 can also be seen to be implemented beyond the LTs.

Points of Control and Observation (PCOs) required for the testing are labeled as A_PCO and AC_PCO on the left hand side, and B_PCO and BC_PCO on the other or right hand side of the IUT 5, respectively. The A_PCO is intended for a signaling link between the IUT and the SPA (Signaling Point A), B_PCO is intended for a signaling link between the IUT and the SPB (Signaling Point B), AC_PCO for the circuits between the IUT and the SPA, and BC_PCO for the circuits between the IUT and the SPB.

The A_PCO and B_PCO are used by the Lower Testers (LTs) for controlling the ISUP signalling links 6 and 7. The AC_PCO and the BC_PCO are used by the Lower Testers (LTs) for observing circuit related events, such as connectivity, echo control check, alerting tone etc.

ISUP PDUs (Protocol Data Units) to be sent and observed on the B_PCO side allow for PDU constraints to be specified and coded down to bit level. The underlying network service provider 20, 21 can be e.g. a Message Transfer Part (MTP) protocol, which is specified in detail in ITU-T Recommendations Q.701-707, which are incorporated herein by reference.

A possible configuration for the above testing arrangement for intermediate exchanges is disclosed by FIG. 2b. In this a Main Testing Component (MTC) 12 is implemented such that it is connected by means of TCPs 14 and 15 to two Parallel Testing Components (PTCs) 11 and 13. The arrangement is such that the MTC 12 is responsible for supervising the two Parallel Testing Components (PTCs) 11 and 13. From these the A_PTC is responsible for the A-IUT interface and the B_PTC is responsible for the IUT-B interface (the order of the abbreviations showing the signalling direction).

The Test Coordination Procedures (TCP) allow communication between the respective parallel testers 11 and 13. The test components may also be implicitly coordinated (asynchronously), since the TCPs between the MTC and the respective PTCs are used only before checking the state of the ISUP signalling circuits and when it is necessary to obtain a verdict from the PTCs 11 and 13.

FIG. 2b discloses thus two PTCs or testing components which are parallelly allocated on both sides of the object to be tested. However, even though only two PTCs are disclosed, it is to be understood that the number of the parallely allocated, test components can be even remarkably greater than two.

The MTC 12 is controlling the PTCs 11 and 13 through the TCP links 14 and 15. Therefore it is possible to control the incoming and outdoing sides of the IUT 5 equivalently in the testing process. This, in turn, makes the arrangement symmetric and the test results for the incoming and outgoing sides comparable to each others.

Figure 3A:
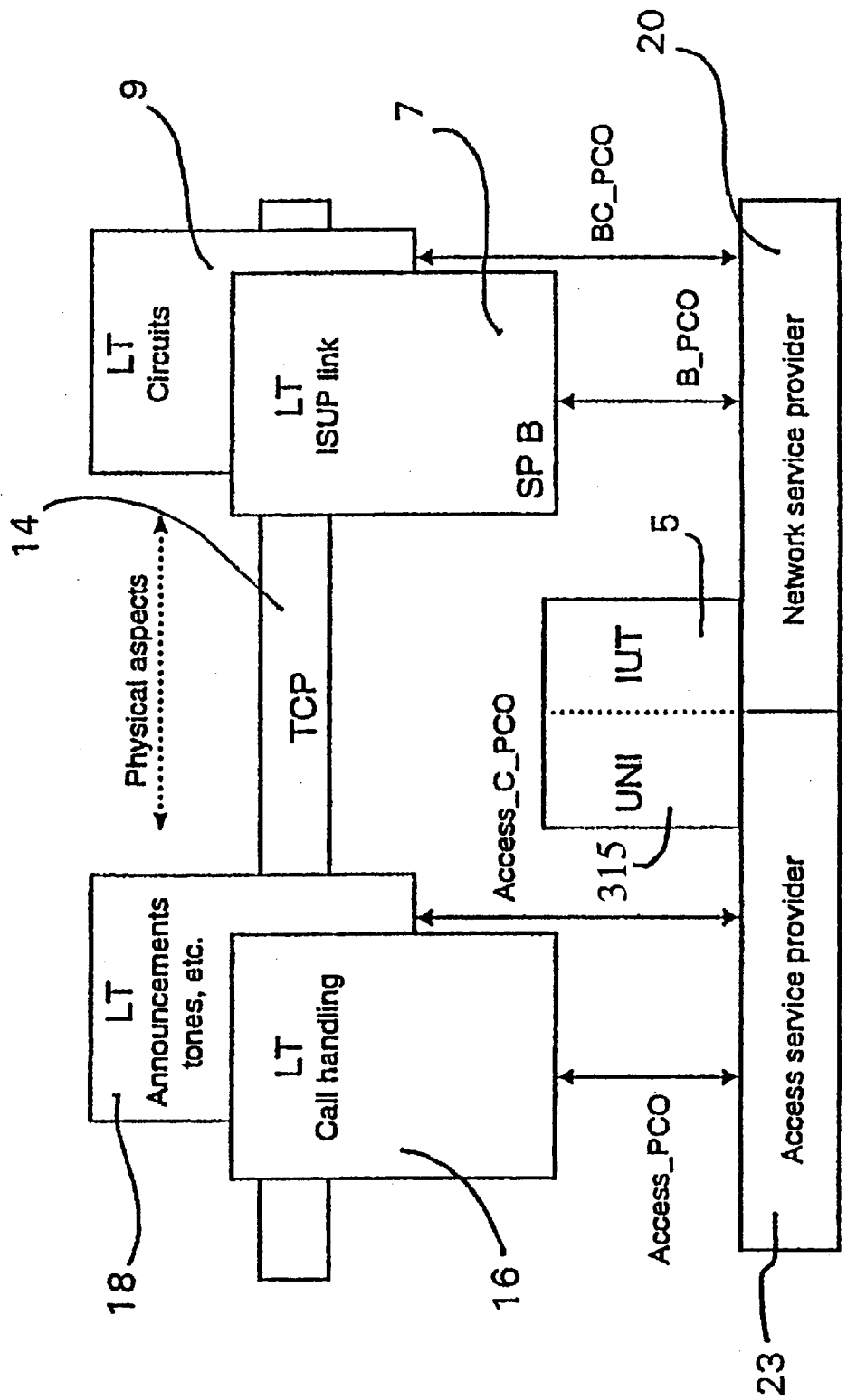
FIGS. 3a and 3b are schematic presentations of another embodiment of the present invention.
Figure 3B:
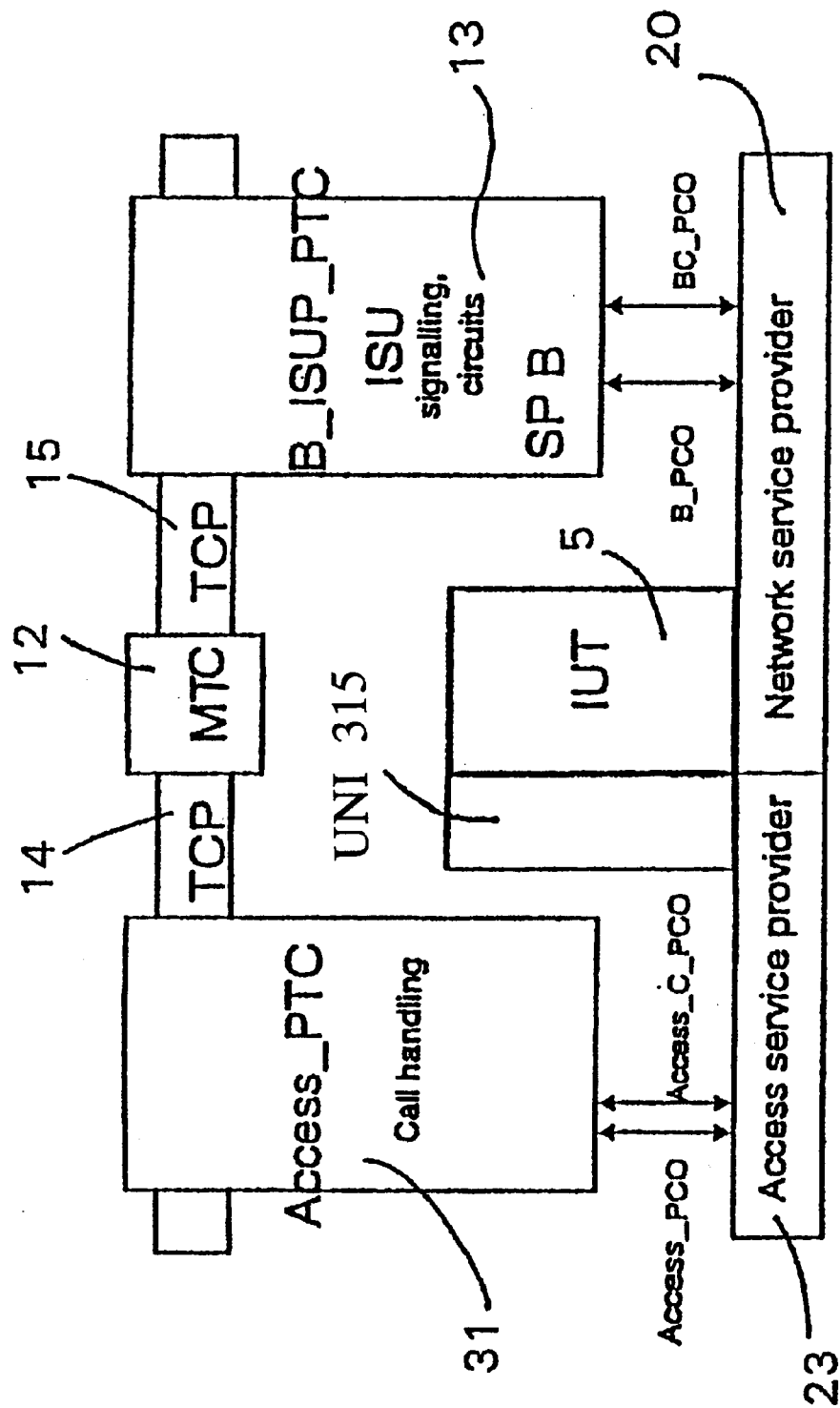

FIGS. 3a and 3b disclose a testing arrangement for local exchanges or originating/destination exchanges of a telecommunications network. A common problem in here has been that, when testing a local exchange, it has been difficult, and in many cases even impossible, to observe only the ISUP PDUs, if the functionality, such as connectivity, tones and announcements etc., associated with the protocol events is to be considered and used to assign the verdicts.

The IUT 5 is now positioned on the interface between an access service provider 23 (access side) and a network service provider 20 (network side). A PCO from an ISUP (IUT 5) to the access side is needed, e.g. for stimulating the local exchange to originate a call by sending an IAM (Initial Address Message). Another PCO is needed to check the connectivity or tones generated by the local exchange.

In most cases there is no exposed interface from the ISUP (which is now the IUT) towards the access side. For the practical testing purposes the access interface may be selected for this purpose. It is reasonable to make use of the access interface, e.g. the user access interface DSS1 (Digital Subscriber System 1 protocol) as a PCO and to use existing naming conventions for the Abstract Service Primitives (ASPs) to be used in this PCO. In the Abstract Testing Suite (ATS) there is a possibility to choose the used access protocol from the DSS1. A more general access-like pseudo protocol may be used, or it is possible to just simply use manual operations to stimulate the ISUP (i.e. the IUT 5).

In the example of FIGS. 3a and 3b disclosing a possible configuration for a multi party testing arrangement for local exchanges each of the testers has a single PCO. The PCO for the access uses the underlying access service provider (e.g. a LAPD in case of DSS1) for observing access events and stimulating the ISUP via the access. The ISUP implementation (i.e. the IUT) cannot be tested without involving the User Network Interface (UNI 315) part to this process.

The right hand side in FIGS. 3a and b is considered as the network side, and the left hand side as the access side. Both sides are provided with two PCOs. In the network side the B_PCO is used by a LT controlling an ISUP signalling link, whereas the BC_PCO is used by another LT controlling traffic channels (e.g. for observing circuit related events, such as connectivity, alerting tone etc.). The ISUP PDUs to be sent and observed on the B_PCO side allow for PDU constraints to be specified and coded down to the bit-level. On the access side the ACCESS_PCO (or an Access signalling PCO (D-channel)) is used to observe and control Call Handling events, whereas the ACCESS_C_PCO (or an Access physical circuit PCO (B-channel)) is used to control and observe physical aspects (e.g. tones and announcements).

The access PDUs to be sent and observed on the ACCESS_PCO are chosen at an appropriate level of abstraction. DSS1-like primitive names can be used for the access ASPs (Abstract Service Primitives). In the ATS the access PDU constraints are given for the DSS1 protocol, whereas the PDU constraints have not been coded to the bit-level for the pseudo access protocol. The access aspects cannot be left out for local exchanges. This widens in some extend the scope of the ISUP signalling.

The exemplifying configuration for a local exchange is disclosed by FIG. 3b. A Master Testing Component (MTC) 12 is arranged to supervise two Parallel Testing Components (PTCs) 13 and 31. The B_ISUP_PTC is responsible for the ITU_B interface and the ACCESS_PTC is responsible for the UNI access interface. For simplifying reasons a maintenance PCO is integrated in the MTC.

Figure 4:
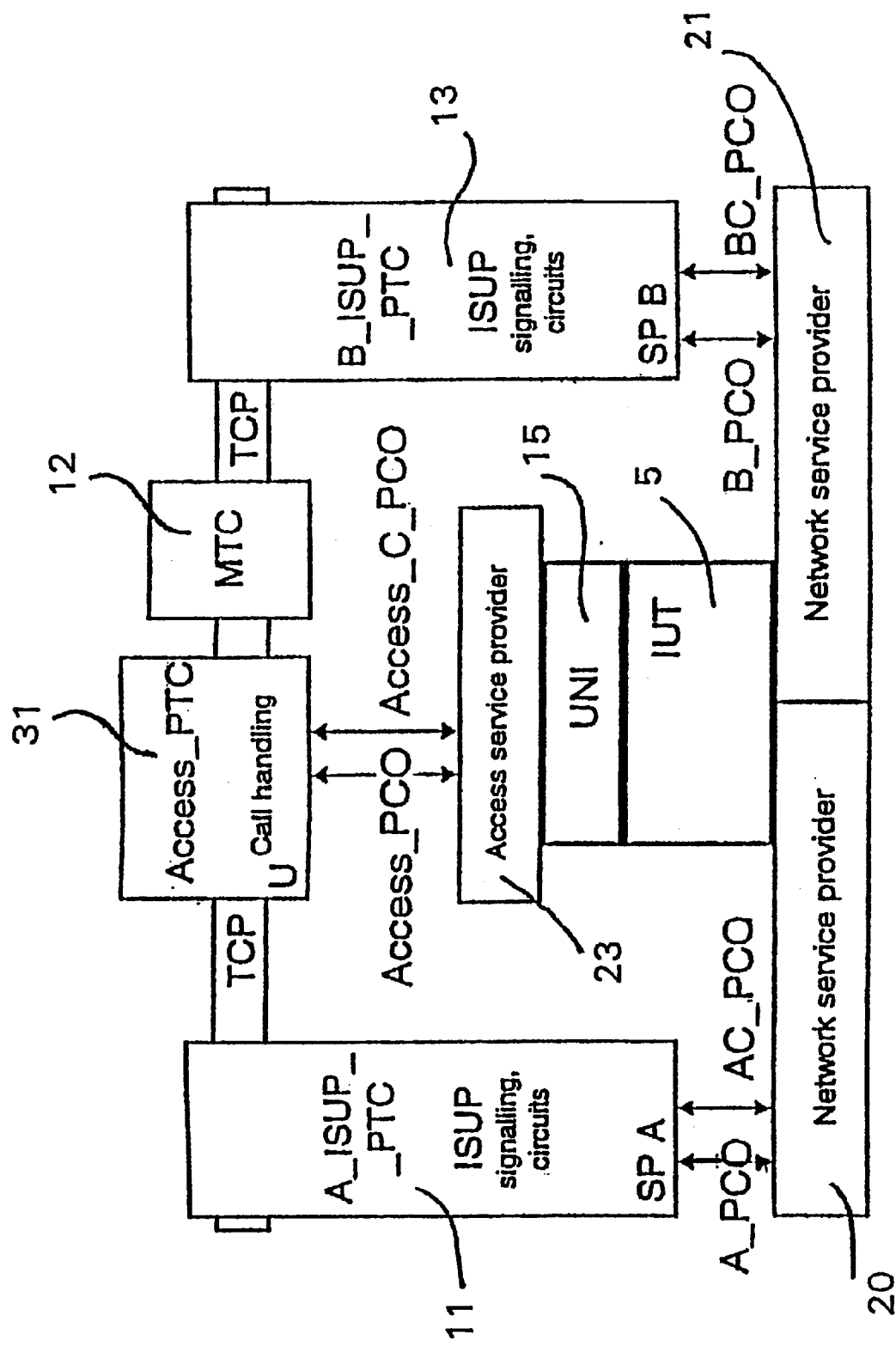
FIG. 4 discloses a still further embodiment.

There are also such test cases for the local exchanges, especially when supplementary services are used, where it is appropriate to use a mixed testing configuration. FIG. 4 discloses one example for such mixed testing configuration, showing and shortly explaining the respective Points of Control and Observation (PCOs).

In this configuration the Main Test Component (MTC) 12 supervises through a PCT link three Parallel Test Components (PTCs) 11,13 and 31: two ISUP PTCs and one access PTC. As can be seen the arrangement includes two network service providers 20, 21 (see FIGS. 2a and b) and also an access service provider 23 (see FIGS. 3a and b). In this case the local exchange (IUT) is the exchange which serves that particular user who initially activated the supplementary service.

Lets now consider the master-slave aspects of the above described configurations. FIGS. 2b, 3b and 4 each show a logical test component of the adopted test configuration. Each of the arrangements includes a MTC supervising the plurality of parallelly allocated test components. In addition, there is always an ISUP PCT located on the right hand side of the IUT, whereas on the left hand side there are different kinds of Parallel Test Components (PCTs): ISUP (FIG. 2b), access (FIG. 3b) or both (FIG. 4).

The ATS for the arrangement can be written e.g. by a TTCN (Tree and Tabular Combined Notation) and so that an appropriate configuration is chosen in accordance with the role of the exchange to be tested.

The right hand side PTC may be an international or national ISUP and configurable so that any two of these may be run. The selection is based on answers given to PIXIT (Protocol Implementation Extra Information for Testing) questions. The left hand side PCT may be of any kind. For instance, it may be an international or national ISUP, and access signalling system or a non-ISUP user part. When executing a test only one of these configurations will be selected, the selection being made on the basis of information provided in the PICS (Protocol Information Conformats Statement) and PIXIT.

For gateway exchanges it may be assumed by default that a call is set up from the left PTC to the right PTC. Thus a national network is located in this case on the left hand side of the IUT for the outgoing international exchange and the international network is then on the right hand side of the IUT. For incoming international exchanges the international network is located on the left hand side and the national network for handling the calls on the right hand side.

The message flow in the tests can be designed such that the verdict is assigned on the basis of observing the behaviors synchronously in both sides. The behaviors (the behaviors being a form of the possible results) are thus comparable. According to one scenario an expected behavior of the sides is required For assigning a positive verdict for the test, otherwise the test gives a negative verdict, i.e. the object failed in the test.

Thus, the invention provides an apparatus and a method for testing by which a significant improvement can be achieved. The arrangement according to the present invention is easy and economical to realize by per se known components and reliable in use. It should be noted that the foregoing examples of the embodiments of the invention are not intended to restrict the scope of the invention to the specific forms presented above but the present invention is meant rather to cover all modifications, similarities and alternatives which are included in the spirit and scope of the present invention, as defined by the appended claims. All additional embodiments, modifications and applications obvious to those skilled in the art are thus included within the spirit and scope of the invention as set forth by the claims appended hereto.

Abbreviations in Figures

FIG. 1
IUT—Implementation Under Test
MTC—Main Test Component
PTC—Parallel Test Component
TCP—Test Coordination Procedures
LAB—PCO for the AB signalling link
CAB—Circuit PCO for the AB interface
ACH—Access call handling PCO (D-channel)
APH—Access physical circuit PCO (B-channel)

FIGS. 2a & 2b
LT—Lower Tester
PCO—Point of Control and Observation
SP—Signalling Point
B_PCO for signalling link between IUT and SPB
BC_PCO for circuits between IUT and SPB
A_PCO for signalling link between IUT and SPA
AC_PCO for circuits between IUT and SPA FIGS. 3a & 3b
TCP—Test Coordination Procedures
UNI—User-network interface
B_PCO—PCO for IUT-B signalling link
BC_PCO—Circuit PCO on IUT-B interface
Access_PCO—Access signalling PCO (D-channel)
Access_C_PCO—Access physical circuit PCO (B-channel)
MTC—Main Test
TCP—Test Coordination
B_PCO—PCO for the IUT-B signalling
BC-PCO—Circuit PCO for the IUT-B
Access_PCO—Access call handling PCO (D-)
Access_C_PCO—Access physical circuit PCO (B-)

FIG. 4
TCP—Test Coordination Procedures
B_PCO for the IUT-B signalling link
BC_PCO Circuit PCO for the IUT-B interface
A_PCO for the A-IUT signalling link
AC_PCO Circuit PCO for the AC interface
Access—Access call handling PCO (D-channel)
Access_C_PCO—Access physical circuit PCO (B-channel)
U—user_call_handling point

What is claimed is:

1. A method for testing incoming and outgoing sides of an object in a telecommunications system via a symmetric test structure, comprising:

allocating a plurality of test components in-parallel for the incoming and the outgoing sides of the object;

performing testing routines for the incoming and the outgoing sides of the object via the in-parallel allocated test components;

controlling operation of the in-parallel allocated test components via a main test component connected to each of the in-parallel allocated test components; and observing functionality of the object by comparing results of testing routines for the incoming side of the object with results of testing routines for the outgoing side of the object.

2. A method according to claim 1, wherein the object to be tested is a telephone exchange.

3. An arrangement for testing an object in a telecommunications system, said object having an incoming side and an outgoing side, the arrangement comprising:

a plurality of test components which are allocated in-parallel for the incoming and the outgoing sides of the object under test; and a main test component arranged to equivalently control each of the in-parallel allocated test components in the incoming and the outgoing sides of the object;

wherein a resulting test structure for testing the object is symmetric, and wherein the main test component observes functionality of the object by comparing results of testing routines for the incoming side of the object with results of testing routines for the outgoing side of the object.

4. An arrangement according to claim 3, wherein the object to be tested is an intermediate telephone exchange implemented between two network service providers in the telecommunications system.

5. An arrangement according to claim 3, wherein the object to be tested is an one of an originating telephone exchange and a destination telephone exchange, implemented on an interface between an access service provider and a network service provider.

6. An arrangement according to claim 3, wherein the object to be tested is a telephone exchange interfacing a plurality of network service providers and an access service provider.

7. An arrangement according to claim 3, wherein a) test coordination procedures are arranged between the in-parallel allocated test components, and b) the main test component controls each of the in-parallel allocated test components.

8. A method according to claim 2, wherein the telephone exchange is one of an intermediate exchange, an originating exchange and a destination exchange.

* * * * *